Jan. 7, 1969     R. W. DOCHTERMAN     3,420,335
LUBRICATION SYSTEM FOR ELECTRIC MACHINES
Filed Feb. 28, 1967     Sheet 1 of 2
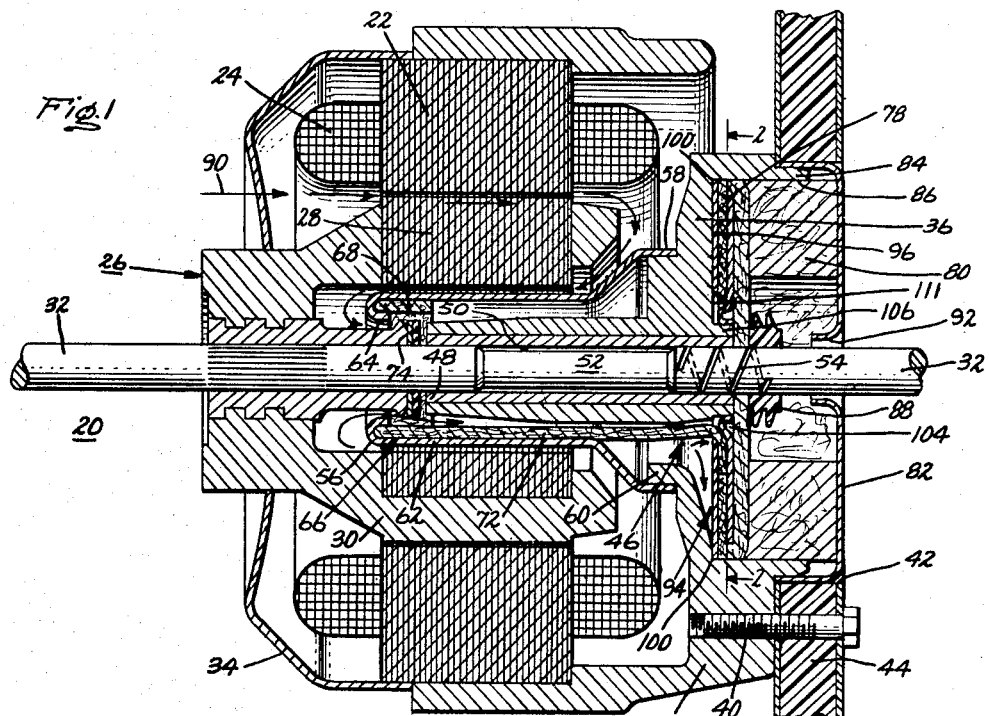
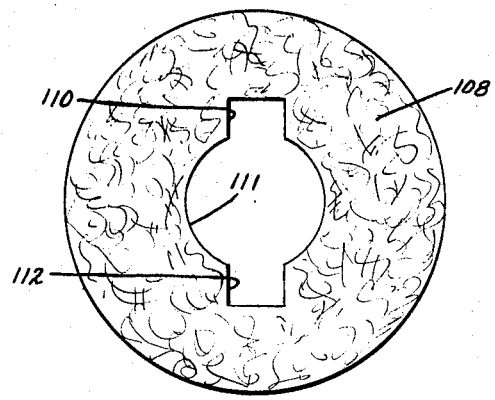
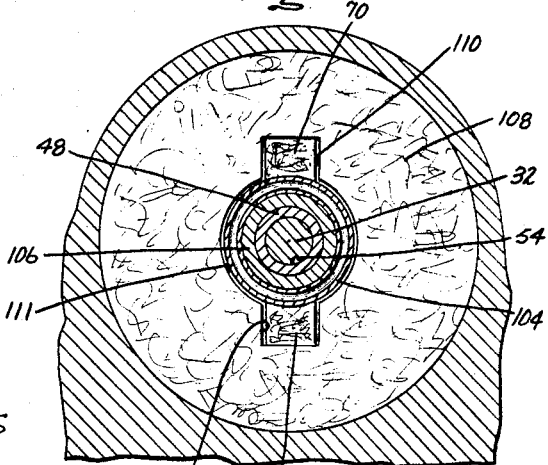
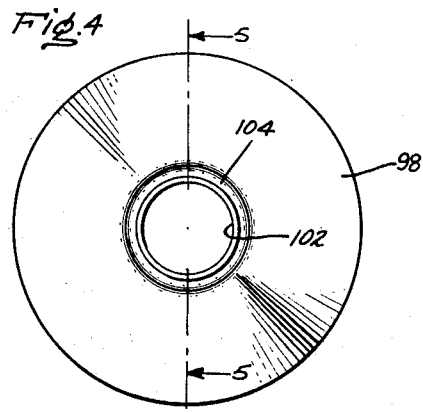
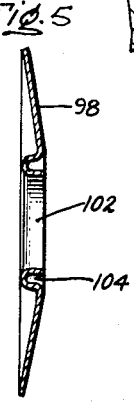
INVENTOR.
Richard W. Dochterman,
BY A. Sidney Alpert
Attorney.

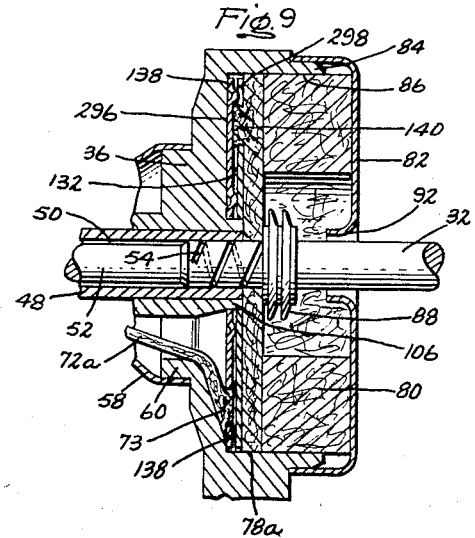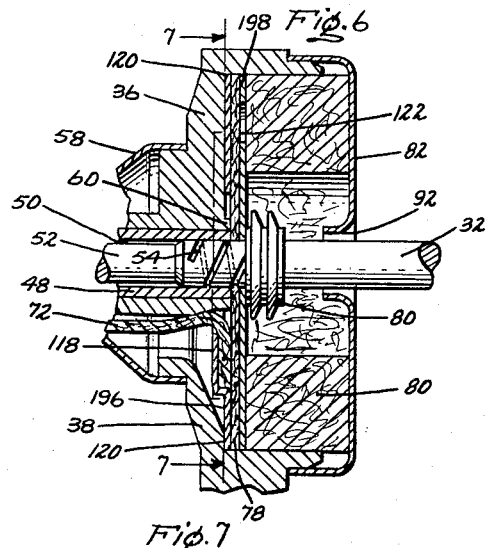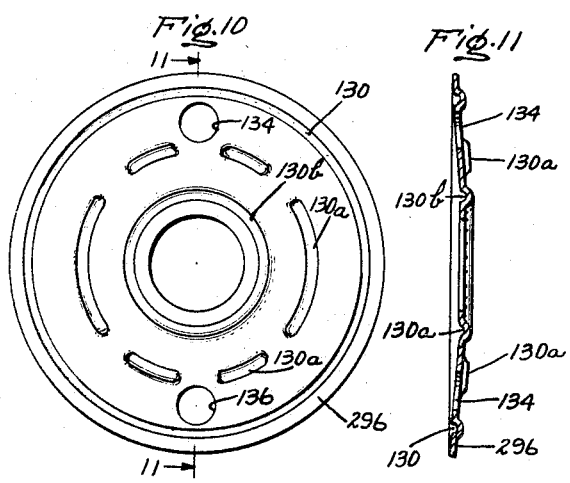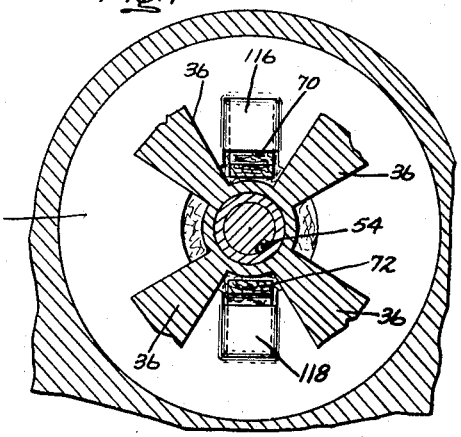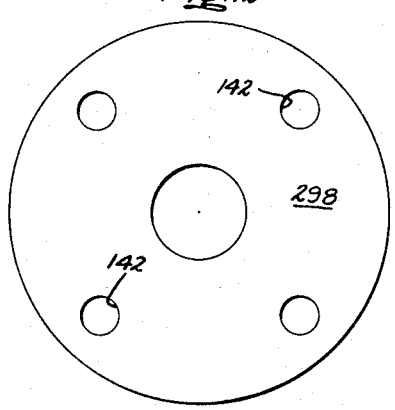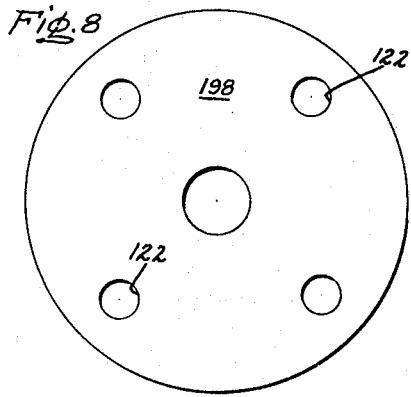
INVENTOR.
Richard W. Dochterman,
BY A. Sidney Alpert
Attorney.

United States Patent Office 3,420,335
Patented Jan. 7, 1969

3,420,335
LUBRICATION SYSTEM FOR
ELECTRIC MACHINES
Richard W. Dochterman, Fort Wayne, Ind., assignor to
General Electric Company, a corporation of New
York
Filed Feb. 28, 1967, Ser. No. 619,429
U.S. Cl. 184—6                                9 Claims
Int. Cl. F01m 1/00

ABSTRACT OF THE DISCLOSURE

A lubrication system which serves both to lubricate bearings and to occlude the primary airflow path through a machine. The system includes a capillary seal (spaced apart plates with or without wick material therebetween) serving both as a capillary air seal and as a portion of a lubricant transfer path. This system is especially effective to support a pressure differential across an electric motor.

Background of the invention

This invention relates generally to lubrication systems for bearing supported shaft members, and more particularly to improved air sealing lubrication systems for supplying lubricant to the bearing journaling surfaces in electric machines while also preventing air flow therethrough.

In current refrigeration systems having at least one refrigerated compartment and a compartment open to the ambient area and housing such system components as a condenser and compressor, a motor driven fan is usually mounted in each compartment for purposes of circulating air. In such systems, it has been the practice to mount a separate motor and fan within each compartment.

In order to reduce cost and yet retain the air circulation benefits, it is quite desirable to use only one motor to drive a number of fans since this obviously will cost less than a separate motor for each fan. It is also desirable in order to accomplish this end that this one motor be mounted exteriorly of the refrigerated compartment so that motor heat will not be introduced into the refrigerated compartment during operation of the motor.

However, this approach introduces certain difficulties since there is a pressure differential between the interior of a refrigerated compartment and the ambient area about the compartment. Thus, when a refrigerated compartment is cooled, the pressure and temperature in the compartment are lowered, and a pressure differential is created between the compartment and the surrounding area such as the room or the condenser compartment. It is well known that in commercial refrigerator units for example, pressure differentials ranging between three and six inches of water occur during at least the first portion of each cooling cycle. Normal leakage through the door seal, electrical conduit openings, etc., equalizes the pressure within and without the refrigerated compartment after some period of time.

It would be desirable to place an externally mounted fan motor in sealed engagement within an opening in the wall of a refrigerated compartment with the motor shaft extending through the opening into the compartment for mounting the fan with the shaft also being accessible in order to drive a second fan in another compartment. However, if there is an airflow path through the motor, relatively warm, moist ambient air will be drawn through the motor into the refrigerated compartment due to the initial pressure differential across the motor. This air flowing through the motor into the compartment deposits its moisture onto the first cold object it contacts, which is the motor shaft, fan blades, and fan enclosure. This will result in ice forming on the shaft and blades and the motor may then overload and eventually burn out. Damage to motors used in this application is especially undesirable as these motors are normally mounted in relatively inaccessible locations and thus are difficult to repair or replace.

I have found that the usual fan motor is unacceptable for the discussed application as it will not support a pressure differential without at least some air leakage. The primary path of air flowing through the usual totally enclosed fan motor when it is mounted across a pressure differential occurs in the bearing lubrication system.

Accordingly, it would be highly desirable to provide a fan motor which may be mounted externally of a refrigerated compartment in communication both with the interior of the compartment and with the surrounding locations such as the room in which the refrigeration apparatus is present or the compressor compartment. In this regard, it would be advantageous to provide an inexpensive fan motor having a highly dependable air sealing lubrication system which prevents air flow through the motor, and especially through the primary airflow path of the motor.

It is therefore, a general object of this invention to provide an electric machine having a lubrication system which alleviates the problems and incorporates the desired results mentioned above.

It is a more specific object of the present invention to provide an improved lubrication system for an electric machine having a bearing supported rotatable shaft which incorporates an airflow sealing arrangement for occluding the primary airflow path through the machine.

A further object of the present invention is the provision of a capillary sealed lubrication arrangement for an electric machine which is inexpensive to produce and highly dependable in operation, and which nonetheless provides adequately controlled lubricant feed to the motor bearing shaft area.

Another object of the present invention is to provide a totally enclosed electric motor which will support a pressure differential thereacross.

Summary of the invention

In carrying out the objects of the present invention in one form thereof, I provide an improved lubricant system for an electric machine. Briefly, the arrangement includes a sleeve-type bearing having a bore for rotatably journaling the machine shaft and a lubricant feed wick for supplying lubricant to the bearing bore by capillary action. Also included is a lubricant transfer wick extending axially of the bearing for transporting lubricant to the feed wick. The transfer wick communicates with a capillary sealing means which is located in the primary airflow path through the motor for preventing air flow therethrough.

In a first embodiment, the capillary sealing means comprises a pair of spaced apart plates in sealed communication with the motor housing and providing both a portion of the primary airflow path through the motor and a portion of the lubricant transporting path between the bearing bore and feed wick. In this embodiment, the spacing between the plates carries capillary feed material such as felt, which communicates with the feed wick and with the transfer wick and is therefore normally filled with lubricant. The felt material is of a sufficient density to allow lubricant to readily flow therethrough, while also providing a barrier to air flow between the plates.

In another embodiment, the capillary sealing means comprises a pair of plates spaced apart at a capillary dimension, to provide a capillary spacing which communicates with the feed and transfer wicks. The spacing is dimensioned to resist a predetermined pressure differential across it as will become apparent hereinafter.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

*Brief description of drawings*

In the drawings:

FIGURE 1 is a longitudinal cross-sectional view of an electric machine incorporating one form of the present invention;

FIGURE 2 is a vertical-sectional view taken generally on the plane of the line 2—2 of FIGURE 1;

FIGURE 3 is an elevational view of one component of the improved lubrication system illustrated in FIGURES 1 and 2;

FIGURE 4 is an elevational view of another component of the improved lubrication system illustrated in FIGURES 1 and 2;

FIGURE 5 is a vertical-sectional view taken generally on the plane of the line 5—5 of FIGURE 4;

FIGURE 6 is a partial vertical-sectional view similar to that of FIGURE 1 illustrating a second embodiment of the present invention incorporated in an electric machine;

FIGURE 7 is a partial vertical-sectional view taken generally on the plane of the line 7—7 of FIGURE 6;

FIGURE 8 is an elevational view of one of the components of the improved lubrication system illustrated in FIGURES 6 and 7;

FIGURE 9 is a partial sectional view through a motor illustrating a third embodiment of the present invention;

FIGURE 10 is an elevational view of one of the components of the improved lubrication system illustrated in FIGURE 9;

FIGURE 11 is a vertical-sectional view taken generally on the plane of the line 11—11 of FIGURE 10;

FIGURE 12 is an elevational view of another of the components of the improved lubrication system illustrated in FIGURE 9.

*Description of the preferred embodiments*

Referring now to the drawings in more detail and in particular to FIGURES 1–5 inclusive, the first embodiment of the invention is illustrated as being incorporated in a small electric motor generally identified by numeral 20. The motor of the exemplification has a stator 22 of conventional design and carrying the usual winding 24, and a rotor 26 having a core 28 formed of laminated magnetic material, and a squirrel cage portion 30. The rotor is secured to rotate with a shaft 32 which in turn is supported in a bearing 48 joined by the web portion 36 of the end frame 38. As illustrated in FIGURE 1, the end frame 38 includes a plurality of studs 40 for mounting the motor as shown in FIGURE 1 in an aperture 42 in the wall 44 of a refrigerated compartment. It will be appreciated that while the entire compartment is not shown, the motor 20 is mounted in the aperture 42 in wall 44 and communicates both with the interior of the compartment and the area without the compartment.

The end frame 38 has mounted therein a lubrication system or arrangement generally denoted by reference numeral 46 for providing lubricant to a sleeve-type unit bearing 48 mounted in the end frame 38 and supporting the shaft 32 inside the motor housing. The bearing 48 has the usual bore 50, and the shaft 32 is reduced at 52 to provide an annular lubrication storage area between shaft and bearing bore. In addition, the shaft has a spiral lubricant feed groove 54 therein for feeding lubricant into the bearing bore for lubrication of the general areas of the bearing bore.

The lubrication system includes an oil cover on sump 56 having an enlarged portion 58 mounted on the flanged portion 60 of the end frame 38 internally of the motor housing. The oil cover includes a generally tubular shell portion 60 extending axially through the rotor bore which terminates in a reversely bent retaining lip 64. Mounted within the retaining lip 64 is a lubricant transfer wick 66 which includes an annular wick portion 68 and first and second elongate fingers 70 and 72. The annular wick portion recaptures lubricant overflow thrown radially outward from the end of the bearing by slinger 74 and transfers the lubricant by capillary action to fingers 70, 72 which in turn convey the lubricant by capillary flow axially through the housing to a lubricant feed wick 78.

In order for the shaft 32 to function properly within the bearing 48, it is obviously necessary to provide a lubricant feed means to the bearing bore 50, and a return means for the lubricant so that effective utilization of the lubricant within the lubrication system may be obtained. Otherwise, it would be necessary to constantly refill the lubricant system which is, of course, entirely impractical. The lubricant feed function is provided by the feed wick 78, and the lubricant return function is provided in part by the transfer wick 66 and its fingers 70 and 72.

In addition to the lubricant feed and transfer wicks, which incidentally may be of the usual wool packing or wool felt material, or similar acting wicking material, an auxiliary lubricant storage means in the form of an annular wick 80 is provided. The storage or reserve wick 80 is mounted in the end frame 38 by means of a retaining cover 82 which is seated on the flange portion 84 of the end frame 38 and preferably sealed thereon by means of a conventional resin or epoxy sealer or the like. The annular reserve wick 80 is in juxtaposition with the lubricant feed wick 78 and as it is impregnated with the lubricant, it therefore will supply additional lubricant to the feed wick 78 as necessary.

The feed wick 78 is held in the recess 86 provided in the end frame 38 by the cover 82, which presses the reserve wick 80 against the lubricant feed wick 78. To further maintain the feed wick 78 in the recess 86, augmenting the action of the cover 82 and reserve wick 80, a thrust bearing 88 is mounted on the shaft 32 on the outboard side of the feed wick 78. The thrust bearing is press-fit on the shaft 32, retaining the feed wick 78 against the side walls of the bearing 48 and the web portion 36 of the end frame 38.

It will be understood that the normal lubricant path through the lubrication system 46 is from the feed wick 78 to the shaft 32 in the region of the first or front side wall of the bearing 48, the lubricant then being conveyed by the groove 54 upon proper rotation of the shaft 32 into the bearing bore. After the lubricant passes through the bearing bore, it is slung by the slinger 74 into the felt transfer wick 66, and the fingers 70 and 72 carry the lubricant back from the second or rear end of the bearing to the first end thereof for reuse. It will also be appreciated that the densities of the felt wicks are selected to provide the desired rate of feed of lubricant therethrough, the lubricant being carried through the felt wicks by capillary action.

There is a primary airflow path through the motor 20 which if not sealed would allow air to transfer axially through the motor. This is entirely unacceptable in this particular application of the motor as discussed above, since this would allow air to flow into the refrigerated chamber defined by the wall 44. The primary airflow of the motor is through the lubrication system 46. There is, however, another possible or secondary airflow path through the motor which will now be discussed. This secondary path is through the bearing bore itself. However, I have determined by actual tests that for the usual pressure differentials encountered in a refrigeration system (between 3 and 6 inches of water), there is no transfer of air through the bearing bore. In this regard, the shaft and bearing bore tolerances are important, and in the actual motor which I tested the maximum diametrical tolerances limit between shaft 32 and bore 50 is 0.0013 inch.

As I previously explained, the primary airflow path through the motor would normally be through the lubrication system 46 and I have illustrated this path by the arrows 90. In the usual motor of this general type, the airflow path, as illustrated by the arrows 90, would continue past the above mentioned first end of the bearing 48, around or through the lubricant feed wick 78 and outwardly through the clearance opening 92 in the retaining cover 82. However, by this invention, I have channeled the flow path into a capillary sealing means generally denoted by reference numeral 94 which occludes the flow path, preventing air flow through the motor for the pressure differentials across the motor or flow path which will be encountered in actual practice. As a matter of fact, I have determined that my novel capillary sealing means will withstand pressure differentials well in excess of those to be encountered (up to 10 inches of water for 7 hours).

The capillary sealing means 94 in the exemplified embodiment of FIGURE 1 includes a pair of spaced apart and generally annular plates 96 and 98 surrounding the bearing 48. The first plate 96 is seated in air-tight engagement (about the peripheral area 100) in the end frame recess 86, as it is either press-fit in the recess or suitable sealing material such as epoxy resin or the like is used. The other plate 98 includes a centrally located opening 102 therein formed by a bend or flange 104. The flange is in air-tight engagement with the annular extension 106 of the end frame web 36 by being press-fit or cemented therein. By this arrangement, with the plates 96 and 98 being sealed at their outermost and innermost ends respectively, the primary airflow path through the motor is directed between the plates and the area therebetween therefore comprises a portion of the primary airflow path in this motor.

In order to provide a capillary seal in the primary airflow path for preventing air from flowing through the motor in the embodiment of FIGURE 1, I have spaced the plates 96 and 98 at a predetermined distance and mounted therebetween an annular pad of fibrous felt material 108. The annular pad 108 includes a pair of oppositely oriented notches or cutouts 110 and 112 which open to the center opening 111. As will be seen in FIGURES 1 and 2, the terminal or end portions of the fingers 70 and 72 extend respectively into the notches 110 and 112 after extending axially along the bearing 48. These terminal portions of fingers turn outwardly into the spacing between the plates 96 and 98 and abut the angular pad 108. Thus, the capillary lubricant return or flow path from the second or rear end of the bearing or to the feed wick 78 is completed by the annual pad 108. It will be seen in particular in FIGURE 1 that the plate 98 is of somewhat less diameter than the diameter of recess 86, and hence the annular pad 108 and the feed wick 78 are in communication throughout a portion of their respective peripheries. Therefore, lubricant will flow by capillary action through the fingers 70 and 72 to the pad 108 and thence back to the feed wick 78 and will ultimately be returned to the shaft adjacent the front or first end of the bearing 48.

Any air flowing into the motor 20 must take a path between the plates 96 and 98. Therefore, in order to occlude the airflow path, I have chosen for the annular pad 108 a fibrous felt material which is dense enough to withstand the pressure differentials to be encountered in actual practice when it is filled with lubricant. Of course, the pad 108 must also have sufficient capillarity to enable the lubricant also selected for a suitable lubricant viscosity characteristic to readily flow from the fingers 70 and 72 to the feed wick 78. The plates 96 and 98, together with pad 108 thereby form a static or capillary seal to prevent air flow through the motor.

I have chosen a static seal rather than a well-known running seal for use in this motor to occlude the primary airflow path since the former is essentially free from wear, whereas the latter normally has both wear and leakage, while also being prohibitively expensive for this application. In addition, by the arrangement of FIGURE 1, I am able to utilize the capillary sealing means in a dual capacity, i.e., both as an air seal and as a portion of the capillary transfer path between the rear end of the bearing bore and the lubricant feed wick 78.

It will be understood that this invention is unusually versatile since by changing either the viscosity of the lubricant or the density of the felt, I am able to change the flow and/or sealing characteristics of the lubrication system. Furthermore, by the exemplified arrangement, the lubricant system will operate to supply lubricant to the bearing bore and to occlude the primary airflow path when the shaft 32 rotates in either direction.

Referring now specifically to FIGURES 4 and 5, it will be noted that the plate 98, prior to being mounted in the recess 86 is generally convex in shape. I have discovered that by fabricating the plate 98 with this shape and from flexible material such as sheet steel or the like, upon mounting the plate 98 in the recess 86 and applying the retaining cup 82 and thrust collar 88, the plate will flex and will help retain the annular pad 108 in place between the plates 96 and 98.

I have provided a second embodiment of my invention; and illustrated the same in FIGURES 6–8 inclusive. In this embodiment of the invention, the lubricant transfer wick 66 is identical to that disclosed in FIGURES 1 and 2 and includes two elongate finger portions 70 and 72 (only one of which is illustrated). I have also provided two plate means designated by the numerals 196 and 198 respectively. The plate 196 is mounted against the bottom wall of the recess 86, or in other words against the outer wall of the web 36. The web 36, of course, is in actuality a plurality of radial spokes having open spaces therebetween in which the fingers 70 and 72 lie. The plate 196 has a pair of oppositely disposed pockets 116 and 118 which extend and open into the recesses in the end frame 38 between the web 36 as will be seen in FIGURE 6. These pockets 116 and 118 receive the terminal portions of the transfer wick fingers 70 and 73 respectively.

In the embodiment of FIGURES 6–8, there is no annular pad such as the pad 108, but the spacing provided between the juxtaposed plates 196 and 198 is filled by the lubricant feed wick 78 extends radially inwardly into contact with the shaft 32 adjacent the front end of the bearing 48. Thus, it will be appreciated that the lubricant feed path for a first rotation of the shaft 32 is from the feed wick 78 to the shaft, through the bore of the bearing 48, and back through the transfer wick fingers 70 and 72 to the feed wick 78. Also it will be understood that the primary airflow path through the motor is along the fingers 70 and 72 and between the plates 196 and 198, the plate 196 being appropriately sealed in the recess 86 about its periphery at 120. In this embodiment of the invention, the capillary sealing means, rather than being an annular pad such as the pad 108 is the lubricant feed wick 78 itself, which is selected of the proper density to feed lubricant and also to prevent air flow therethrough.

Referring now to FIGURE 8 in conjunction with FIGURE 6, it will be seen that the plate 198 has a plurality of openings 122 therein. These openings in the plate 198 provide a communication path between the feed wick 78 and the reserve or storage wick 80. Thus, if additional lubricant is required in the feed wick, it may readily be passed thereto from the reserve wick 80 through the openings 122. This embodiment of the invention has all the advantages of the first embodiment (FIGURES 1–5), while including one less part and hence is even simpler and less expensive in construction.

A third embodiment of my invention is illustrated in FIGURES 7–12 inclusive of the drawings. Referring initially to FIGURE 9, I have illustrated therein a partial sectional view similar to FIGURE 6 discussed above. As seen in this figure, the transfer wick fingers 70 and 72 (only 72 shown) are wedged between the web 76 and a plate 296 and are thereby forced into the openings 134 and 136 in the plate 296, as indicated at 73. In this embodiment, the plate 296 is in juxtaposition with another plate 298 in the recess 86, with the plate 296 having a plurality of raised portions or nibs 130 thereon for spacing the plate 296 away from the plate 298. Thus, the arrangement of the plates 296 and 298 is such as to provide a capillary spacing 132 therebetween, determined by the dimension of the nibs 130. In addition, it will be observed in FIGURE 10 that the innermost nib 130b is complete while the intermediate nib 130a is interrupted. The lubricant flow path in the arrangement illustrated in FIGURE 9 for a first rotation of the shaft 32 is from the feed wick 78a to the bearing bore, through the bore to the feed fingers 70 and 72, through the pair of openings 134 and 136 in the plate 296 into the capillary spacing 132 between the plates, past the nib 130a, through openings 142 in plate 298 and then back to the feed wick 78a.

The dimension of capillary spacing 132, as defined by the nibs 130, has been selected to provide sufficient resistance to air flow therethrough for the particular application of the motor as described above, as well as to enable lubricant to flow therethrough. In this regard, as is well known to those skilled in the art, the resistance of a capillary spacing is a function of its length, width, and height, as well as the characteristics of the fluid contained therein. Thus, in the embodiment of FIGURE 9, I have dimensioned the capillary spacing 132 to resist a pressure differential thereacross of between 3 and 6 inches of water when it is filled with the specific lubricant to be utilized in this system.

It will be understood that the capillary spacing comprises a portion of the primary flow path through the motor since the plate 296 is sealed with the back wall of the recess 86 about its periphery at 138, and also with the annular projection 106 of the web 36. The capillary spacing 132 is therefore constantly filled with the lubricant being conveyed between the fingers 70 and 72 and the feed wick 78a. The lubricant is conveyed through the capillary spacing 132 to the modified feed wick 78a which includes a compressed portion 140 extending through the apertures 142 in the plate 298 into the capillary spacing 132. In addition, in this embodiment of my invention, the reserve wick 80 is in surface-to-surface compressive contact with the feed wick 78a as in the embodiment illustrated in FIGURES 1–5, and the retaining cup 82 and the thrust collar 88 retain the feed wick 78a and the plate 298 in the recess 86.

It will be appreciated that each of the above described embodiments of my invention when incorporated in a motor allow the motor to operate between chambers at different pressures without any transfer of air through the motor. In addition, each embodiment provides a capillary seal to accomplish this end, which capillary seal serves a dual function, i.e., an air sealing function and a capillary flow function. Thus, the various embodiments of my invention provide a relatively inexpensive yet extremely efficient and dependable means for enabling a motor to be used in refrigeration systems where dependability and long life is a necessity.

It will be understood that various modifications to the illustrated embodiments may be undertaken without departure from the true spirit and scope of the invention. Thus, while I have shown a double shaft arrangement, the invention will be applicable with single shaft motors. Further, while I have shown a single bearing support for the shaft in the motor, it will be appreciated that the invention may as well be incorporated in a motor having a double bearing arrangement. Still further, although I have described the lubrication feed from the feed wick 78a through the bearing bore to the transfer wick 66, as previously mentioned the airflow sealing means described above could be adapted for reverse shaft rotation and lubricant flow in the opposite direction.

While in accordance with the patent statutes, I have described what at present are considered to be the preferred embodiments of my invention, it will be obvious to those skilled in the art that numerous other changes and modifications may be made therein without departing from the invention, and it is therefore aimed in the following claims to cover all such equivalent variations.

What I claim as new and desire to secure by Letters Patent of the United States is:

1. An electric motor adapted for mounting in an air sealed relationship between two locations having different pressures comprising a rotor shaft contained at least partially within a motor housing; a lubricant system including a sleeve bearing having a bore and supporting the rotor shaft within the housing, capillary feed means for supplying lubricant to the bearing bore; a primary airflow path in said housing communicating with the locations; and capillary sealing means located in said primary airflow path for preventing the transfer of air through the housing, said capillary sealing means comprising a portion of a capillary transfer means for transporting lubricant between the bore and said capillary feed means.

2. The electric motor of claim 1 wherein said capillary sealing means includes spaced apart plate means defining a spacing therebetween forming at least a portion of said primary airflow path through said housing, said spacing having lubricant therein for inhibiting the flow of air through said primary airflow path.

3. The electric motor of claim 2 wherein said spacing is of capillary dimensions and communicates with a capillary lubricant feed wick at one end and with said capillary feed means at the other end, thereby having lubricant therein at all times.

4. The electric motor of claim 3 wherein said capillary spacing is of sufficient dimensions to resist a predetermined pressure differential between said two locations.

5. The electric motor of claim 2 wherein said spacing contains a capillary transfer wick therein for transporting lubricant through said spacing.

6. The electric motor of claim 2 wherein said plate means are in air sealed relationship with said housing at predetermined areas in order to define the primary airflow path through said housing.

7. An improved lubrication system for use in an electric motor having a sleeve bearing with a bore, a housing, and a shaft extending through the housing and being supported in the bore of the sleeve bearing, said lubrication system comprising: capillary lubricant feed means for supplying lubricant to the bearing bore; and lubricant transfer means radially outwardly of said bearing bore for conveying lubricant between the bearing bore and the capillary lubricant feed means; and capillary sealing means located in said capillary lubricant transfer means for preventing the transfer of air through the lubricant transfer means, said capillary sealing means normally being filled with lubricant.

8. The improved lubrication system of claim 7 wherein said capillary sealing means comprises a pair of spaced apart plate means defining a capillary spacing therebetween, said capillary spacing carrying lubricant therein and being dimensioned to resist a pressure differential at opposite ends thereof of at least 1 inch of water.

9. The improved lubrication system of claim 7 wherein said capillary sealing means comprises a pair of spaced apart plate means defining a spacing therebetween, and a capillary flow material carried in said spacing, said capillary flow material being of sufficient density to resist a pressure differential on opposite ends of said spacing of at least 1 inch of water when filled with lubricant.

References Cited

UNITED STATES PATENTS

| | | | |
|---|---|---|---|
| 2,571,672 | 10/1951 | Bradley | 310—90 X |
| 2,633,393 | 3/1953 | Bradley | 308—132 X |
| 2,752,208 | 6/1956 | Wightman | 308—132 X |
| 3,243,241 | 3/1966 | Lindt et al. | 308—132 X |
| 3,250,579 | 5/1966 | Tupper et al. | 308—132 X |
| 3,264,045 | 8/1966 | Tupper | 308—132 X |
| 3,336,092 | 8/1967 | Dochterman | 308—132 |
| 3,361,496 | 1/1968 | Cunningham | 308—132 |

HOUSTON S. BELL, JR., *Primary Examiner.*

U.S. Cl. X.R.

184—64; 277—233; 308—121, 132; 310—90